(12) United States Patent
Thompson (10) Patent No.: US 10,974,301 B2
(45) Date of Patent: Apr. 13, 2021

(54) METHOD FOR MANUFACTURING A FISHING JIG

(71) Applicant: Michael Joseph Thompson, Woolooware (AU)

(72) Inventor: Michael Joseph Thompson, Woolooware (AU)

( * ) Notice: Subject to any disclaimer, the term of this patent is extended or adjusted under 35 U.S.C. 154(b) by 120 days.

(21) Appl. No.: 16/294,741

(22) Filed: Mar. 6, 2019

(65) Prior Publication Data
US 2019/0275578 A1 Sep. 12, 2019

(30) Foreign Application Priority Data
Mar. 12, 2018 (AU) ................................ 2018900808

(51) Int. Cl.
| | |
|---|---|
| *B21D 5/16* | (2006.01) |
| *A01K 85/08* | (2006.01) |
| *A01K 85/16* | (2006.01) |
| *B21D 53/00* | (2006.01) |

(52) U.S. Cl.
CPC ................ *B21D 5/16* (2013.01); *A01K 85/08* (2013.01); *A01K 85/16* (2013.01); *B21D 53/00* (2013.01)

(58) Field of Classification Search
CPC .......... B21D 5/16; Y10T 29/49; Y10T 29/496; Y10T 29/49616; Y10T 29/5116
See application file for complete search history.

(56) References Cited

U.S. PATENT DOCUMENTS

| | | | | | |
|---|---|---|---|---|---|
| 1,557,771 | A | * | 10/1925 | Peckinpaugh | ......... A01K 85/08 43/42.28 |
| 2,616,559 | A | * | 11/1952 | Hyland | .................. A01K 85/00 206/315.11 |
| 3,852,870 | A | * | 12/1974 | Elliott | ..................... B21D 53/00 29/413 |
| 4,043,234 | A | * | 8/1977 | Godin | .................... B21D 28/06 83/40 |

* cited by examiner

*Primary Examiner* — David P Bryant
*Assistant Examiner* — Amanda Kreiling (57) ABSTRACT

A method of manufacturing a fishing jig hook allows a user to create a custom fishing jig hook that attracts fish. A user can attract specific fish by using jigs that mimic the appearances of the smaller bait fish that the target fish usually consumes. The fishing jig produced is reusable, thus reducing waste due to extended periods of fishing. Further, the fishing jig is bent to provide a hydrodynamic shape. The formed apparatus provides a malleable disk, a fishing jig hook, a metal-cutting tool, a folding rod, a ruler, a marker, a metal-puncturing tool, and at least one ornament. These tools include the necessary jig lure material required as well as the tools needed to subsequently shape that material.

11 Claims, 14 Drawing Sheets

METHOD FOR MANUFACTURING A FISHING JIG

The current application claims a priority to the Australian Provisional Patent application serial number 2018900808 filed on Mar. 12, 2018.

FIELD OF THE INVENTION

The present invention generally relates to a fishing tool. More specifically, the present invention relates to a method for developing custom fishing lures capable of attracting fish.

BACKGROUND OF THE INVENTION

People have been hunting for food since the development of sustained cooking fires. Cooking meat has facilitated the generation of useful energy from food and thus provided a powerful stimulus for the growth of the human brain. This allowed humans to spend less time eating and more time developing items and tools. Among other things, technology improved to allow for more efficient capture and more enjoyable preparations of various foods. Fishing in particular has evolved to allow for control over selective removal of individual fish. Fishing rods with interchangeable hooks, lines, reels, and other such features enabled fishermen to send their lines over greater or shorter distances and to greater or smaller depths.

As fishing technology and fishing knowledge increase, so too does the need for innovative lures and line additions that can positively impact the ability of fishermen to attract specific fish. However, the equipment required to attract particular fish can be expensive and complex. Modern specialty lures and jigs often are large and unwieldy, resulting in difficulty securing to a line as well as increasing the chances of the added equipment snagging on loose plants underwater. The shape of most such line additions is often not hydrodynamically designed to allow for ease of reeling, but rather bulbous and oftentimes flat, resulting in increased force required when manipulating hook position and collecting fish. Furthermore, jigs and lures often fail to accurately represent the bait they are attempting to replicate. What is needed is a fishing jig that accurately depicts bait animals. Further desirable is a jig that is bent appropriately to ensure hydrodynamic movement.

The present invention addresses these issues. The present invention relates to a process for developing fishing jigs for addition to a fishing line. Developed fishing jigs are shaped from malleable materials, allowing them to adjust to water flow. A crucial step of the present invention involves folding the raw material in half, which results in a consistently hydrodynamic shape. Subsequent processing allows a created fishing jig to more accurately represent bait. Simple assembly results in an adequate amount of exposed hook, as well as ease of fish removal.

DETAILED DESCRIPTION OF THE INVENTION

All illustrations of the drawings are for the purpose of describing selected versions of the present invention and are not intended to limit the scope of the present invention.

Figure 5:
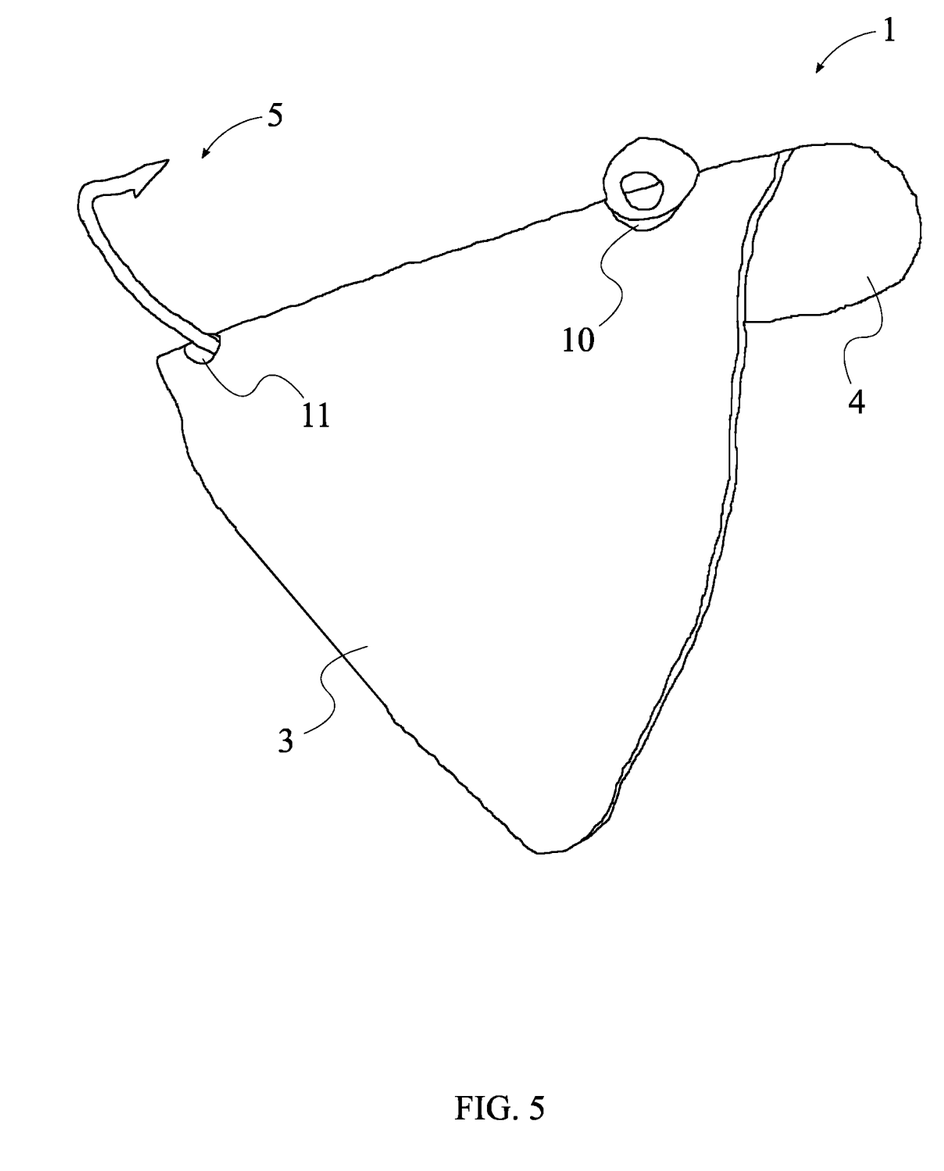
FIG. 5 is a schematic view of step D illustrating the combination of the malleable disk and the fishing hook.
Figure 6:
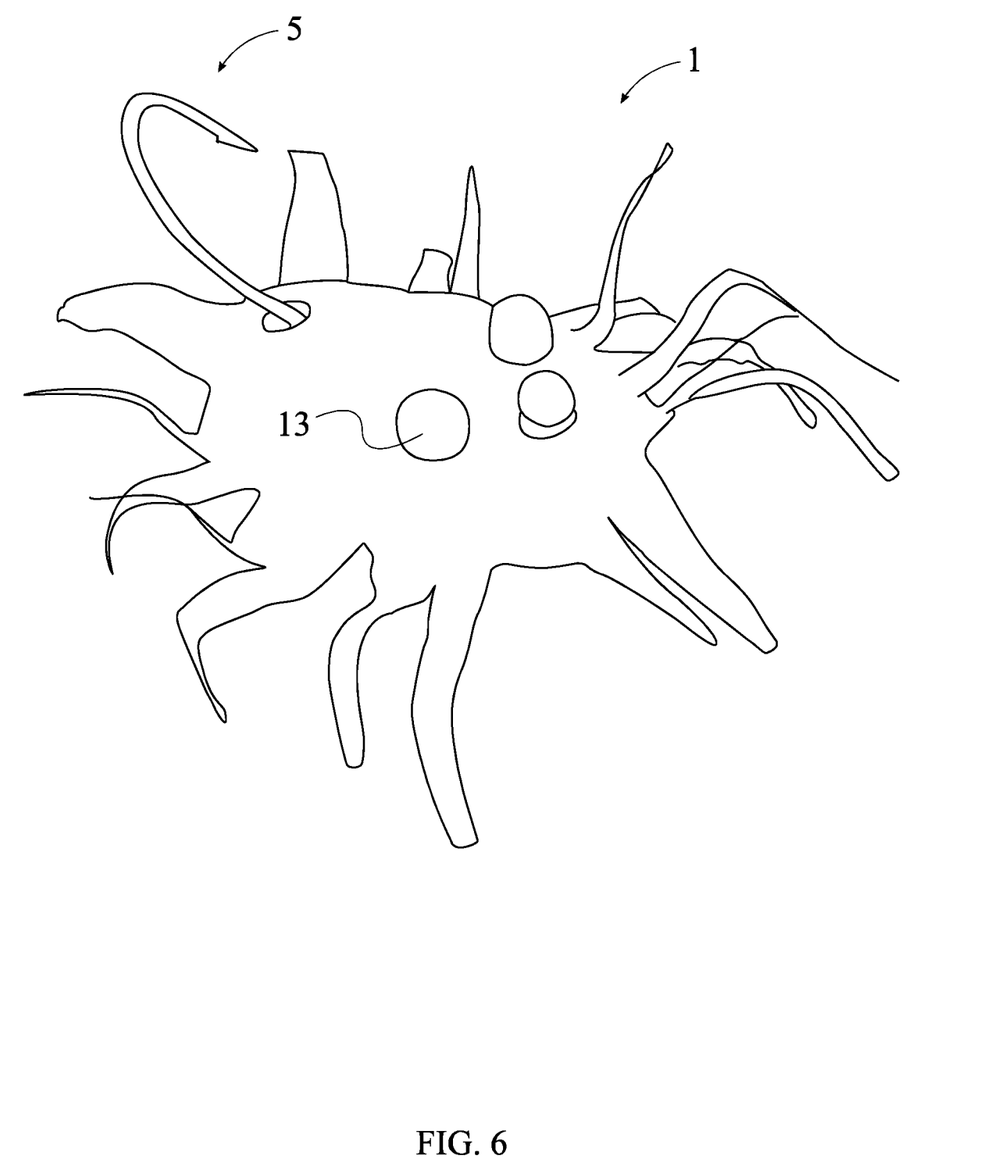
FIG. 6 is a schematic view of step E illustrating the end product of implementing the method of the present invention.
Figure 7:
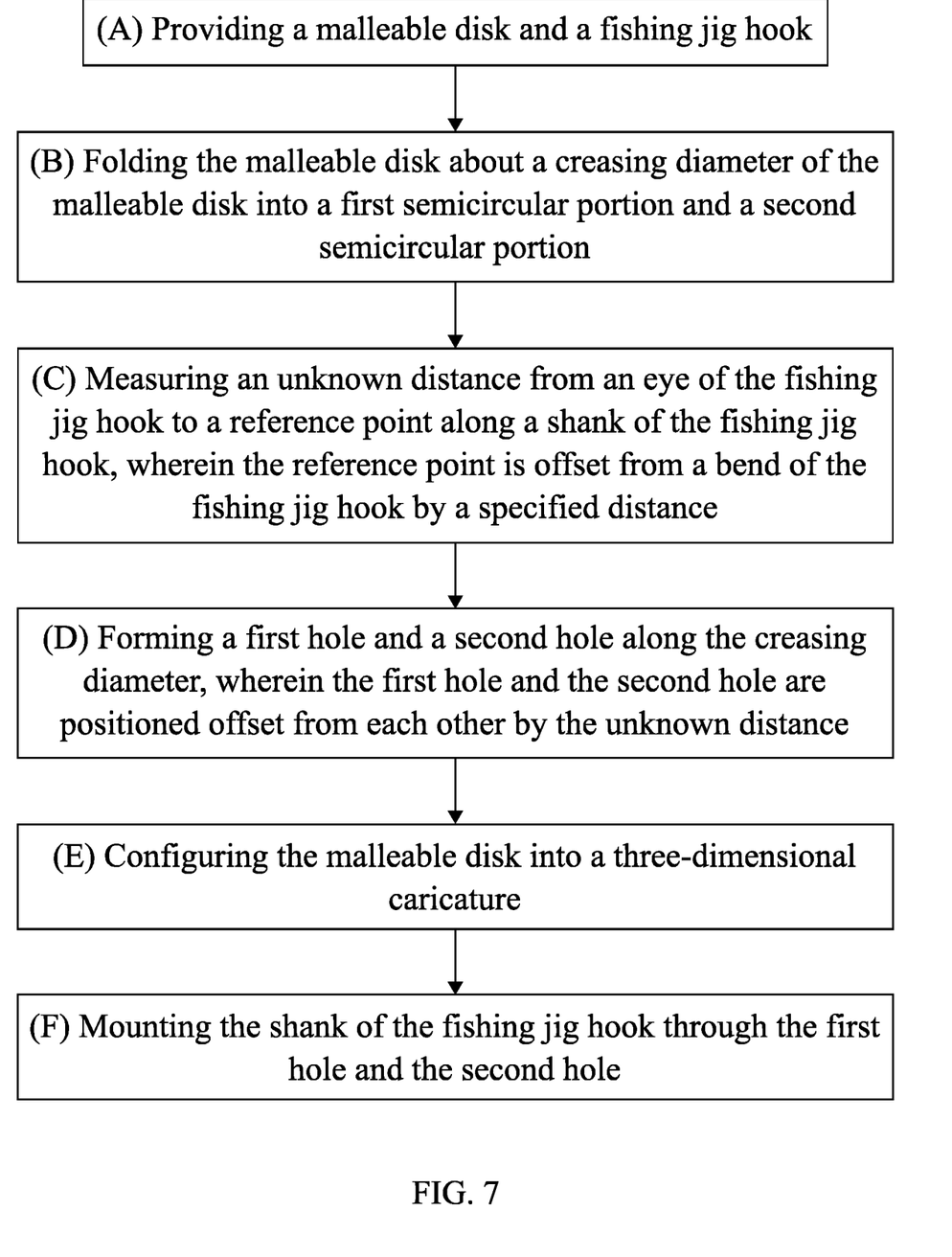
FIG. 7 is a flowchart illustrating the overall process for the method of the present invention.

The present invention allows for the development of fishing jigs. More specifically, the present invention is a system and method for manufacturing fishing jigs, as seen in FIGS. 5 and 6, for various fishing applications. The present invention allows a user to attract specific fish by using jigs that mimic the appearances of the smaller bait fish that the target fish usually consumes. The fishing jig produced by the present invention is reusable, thus reducing waste due to extended periods of fishing. Further, the fishing jig is bent to provide a hydrodynamic shape.

Figure 1:
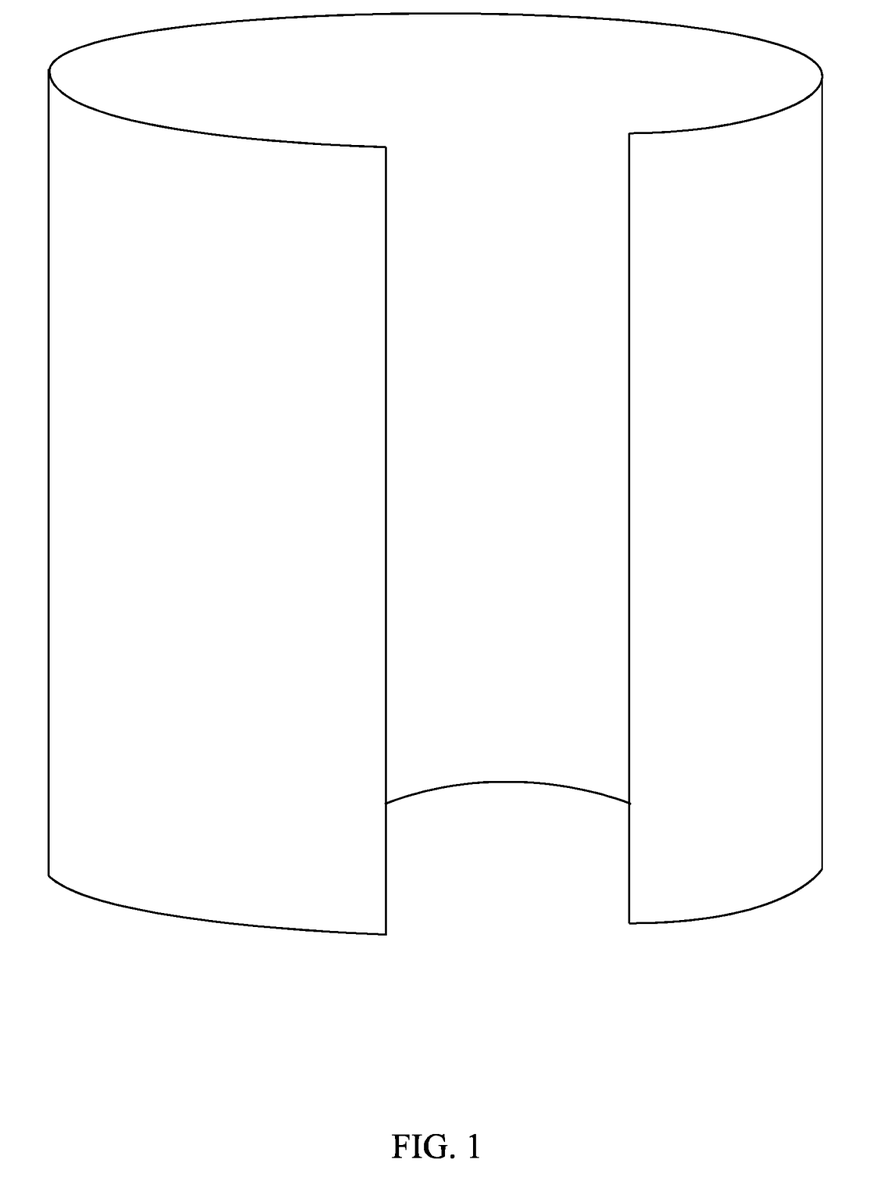
FIG. 1 is a schematic view preceding step A illustrating an unshaped piece of metal.
Figure 2:
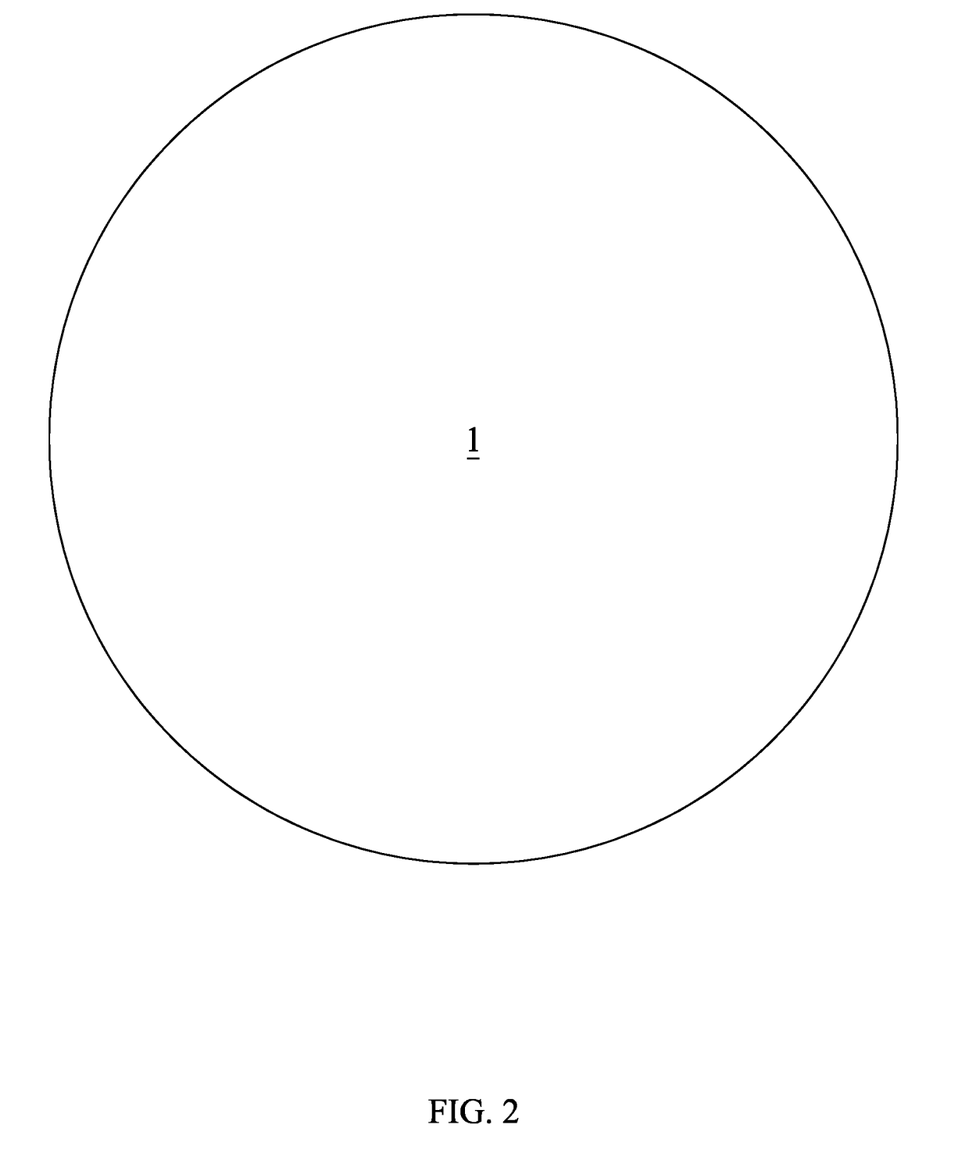
FIG. 2 is a schematic view of step A illustrating a malleable disk that is cut from the unshaped piece of metal.
Figure 8:
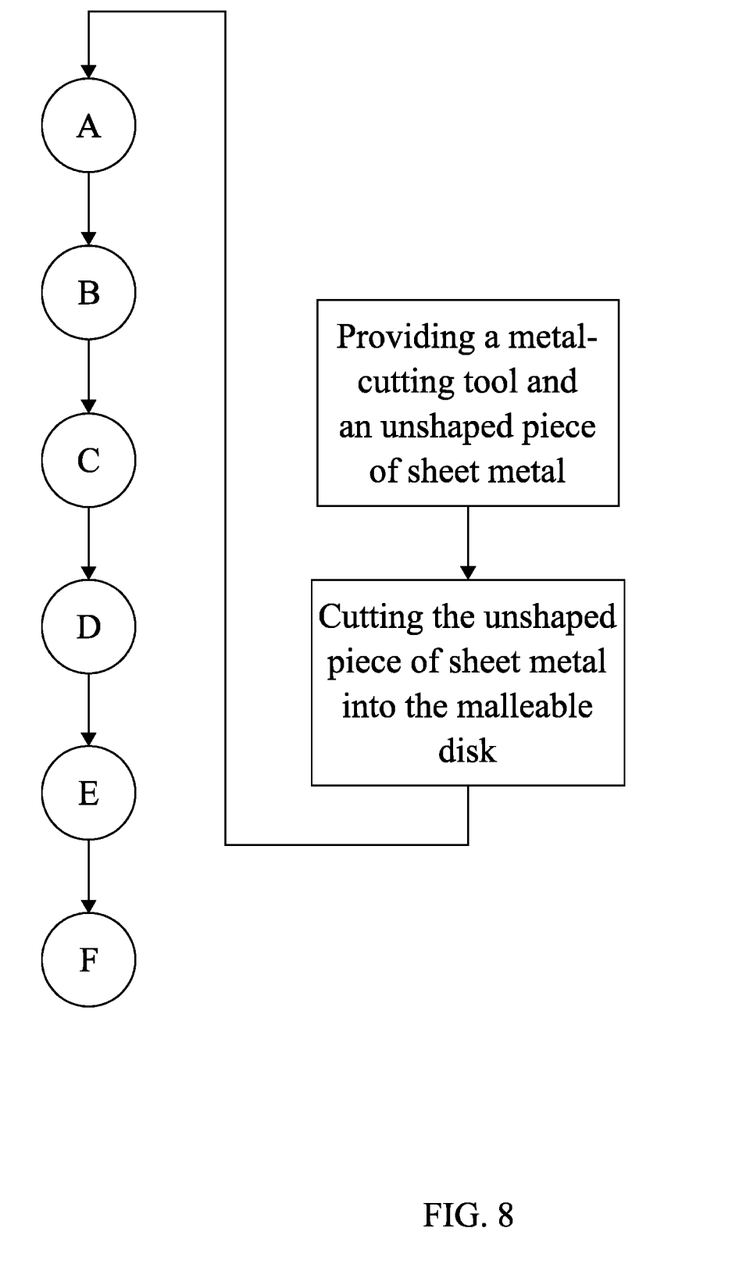
FIG. 8 is a flowchart illustrating the subprocess of pre-shaping an unshaped piece of sheet metal.

In order to execute the steps of the present invention, the system of the present invention requires a malleable disk 1 and a fishing jig hook 5 (Step A). In alternative embodiments, it may be possible to provide a flat mass of malleable material, as seen in FIGS. 1 and 8. The flat mass of malleable material would be subject to shaping into a malleable disk 1, as seen in FIG. 2. Alternatively, the flat mass of malleable material may be shaped to any of a variety of symmetrical shapes for subsequent forming in further steps. The fishing jig hook 5 is a conventional hook that enables connection of the lure resulting from the present invention. Such an arrangement allows the created jig to attract fish to the hook for capture.

Figure 3:
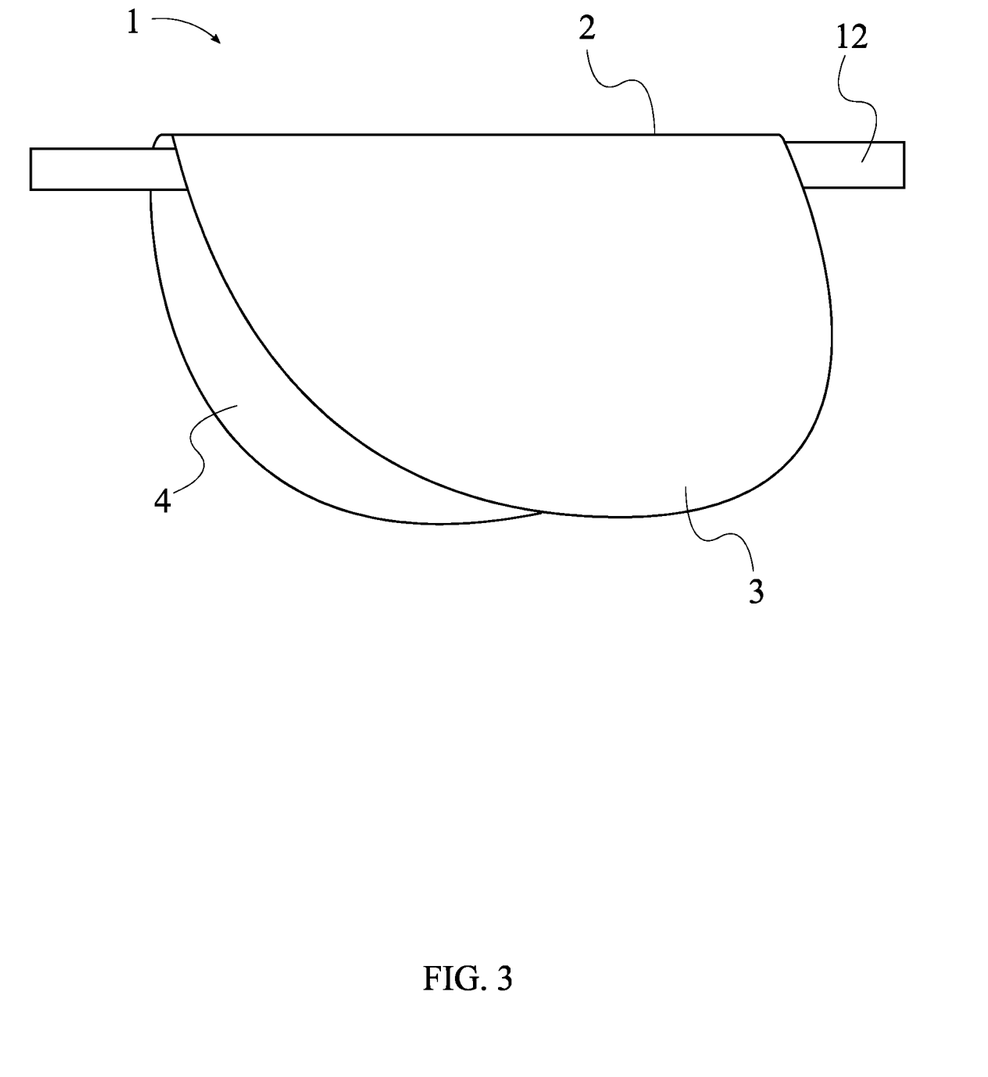
FIG. 3 is a schematic view of step B illustrating the malleable disk being creased with a folding rod.
Figure 9:
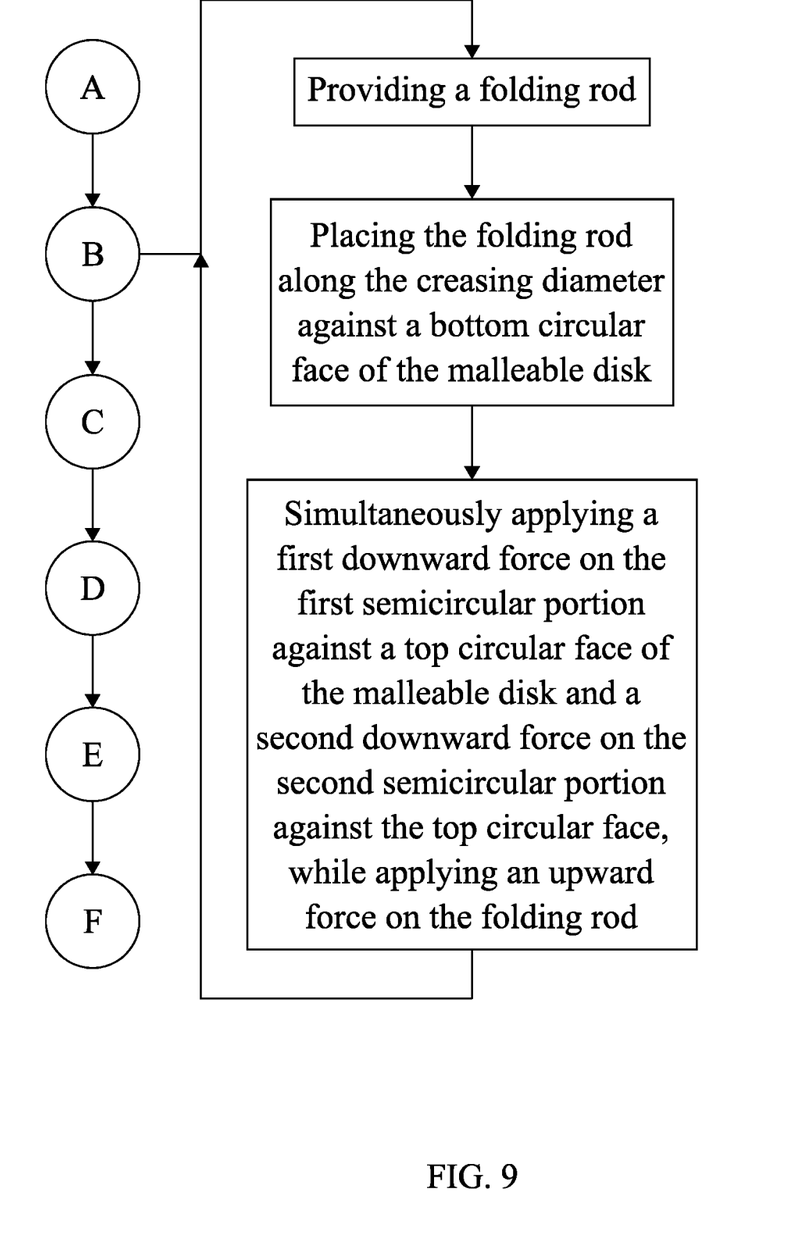
FIG. 9 is a flowchart illustrating the subprocess of folding a metal disk.

The method of the present invention follows an overall process in order to create a fishing jig. In accordance with the preferred embodiment of the present invention, the malleable disk 1 is folded about a creasing diameter 2 of the malleable disk 1 into a first semicircular portion 3 and a second semicircular portion 4 (Step B), as seen in FIGS. 3 and 9. This step shapes the malleable disk 1 into a damage-resistant and hydrodynamic object, thus facilitating pulling of the fishing jig hook 5 through the water. The overall process continues by measuring an unknown distance from an eye 6 of the fishing jig hook 5 to a reference point 8 along a shank 7 of the fishing jig hook 5, wherein the reference point 8 is offset from a bend of the fishing jig hook 5 by a specified distance 9 (Step C). The unknown distance allows the user to determine the appropriate separation for mounting the malleable disk 1 of the present invention to the fishing jig hook 5. The specified distance 9 is a distance that is determined by measuring the length of a fishing hook to be utilized by a fishing jig created from the present invention. A first hole 10 and a second hole 11 are formed along the creasing diameter 2, wherein the first hole 10 and the second hole 11 are positioned offset from each other by the unknown distance (Step D). The first hole 10 and the second hole 11 allow for subsequent connection of the malleable disk 1 to the fishing jig hook 5. The malleable disk 1 is configured into a three-dimensional caricature (Step E). A three-dimensional caricature is a figure that depicts or roughly resembles live bait. This step transforms the malleable disk 1 into a hydrodynamic shape that resembles various bait. Finally, the shank 7 of the fishing jig hook 5 is mounted through the first hole 10 and the second hole 11 (Step F). Upon completion, the user has a fishing jig hook 5 connected to a jig that resembles appropriate bait.

As described above, Step A may vary to allow for the usage of any of a variety of shapes with bilateral symmetry as the malleable disk 1. The bilateral symmetry of the malleable disk 1 ensures that, upon further development, the manufactured jig fits correctly upon the fishing jig hook 5. The malleable disk 1, seen in FIG. 2, must be made of rigid material capable of plastic deformation but not elastic deformation. Various metals are optimal for such a task; however, plastics or other materials may also suffice. In such an embodiment, the present invention is provided with a metal-cutting tool and an unshaped piece of sheet metal. The metal-cutting tool may be a set of scissors or shears capable of slicing through the unshaped piece of metal. The user then cuts the unshaped piece of sheet metal into the malleable disk 1 with the metal-cutting tool. In this way, metals of various shapes can all be utilized to produce a jig. In an alternative embodiment, the user cuts the unshaped piece of sheet metal into a shape with bilateral symmetry with the metal-cutting tool. A shape with bilateral symmetry is any three-dimensional shape that is symmetrical about some axis. This arrangement may be advantageous when developing a jig of irregular, uneven shape, particularly longer shapes.

Following the shaping and forming of the malleable disk 1 in Step A, Step B begins by providing a folding rod 12, as seen in FIG. 3. The folding rod 12 is a device about which the malleable disk 1 can be placed, allowing the user to press the malleable disk 1 into a bent shape. The folding rod 12 is placed along the creasing diameter 2 against a bottom circular face of the malleable disk 1. This arrangement provides ample bending space for manipulating the shape of the malleable disk 1. A first downward force on the first semicircular portion 3 against a top circular face of the malleable disk 1 and a second downward force on the second semicircular portion 4 against the top circular face are simultaneously applied, while an upward force on the folding rod 12 is also simultaneously applied. In this way, the malleable disk 1 is symmetrically folded into the first semicircular portion 3 and the second semicircular portion 4 about the creasing diameter 2.

Furthermore, an arch-shaped bend is formed through the malleable disk 1 along the creasing diameter 2 during Step B. This arrangement ensures that the malleable disk 1 is appropriately folded into two halves, as seen in FIG. 3. A curvature radius of the arch-shaped bend is preferably greater than or equal to three millimeters. In this way, the curvature radius is sharp enough to ensure efficient subsequent processing, but not so sharp as to affect the performance of the jig or to compromise the safety of the user. In this way, Step B results in the malleable disk 1 being symmetrically bent.

Figure 4:
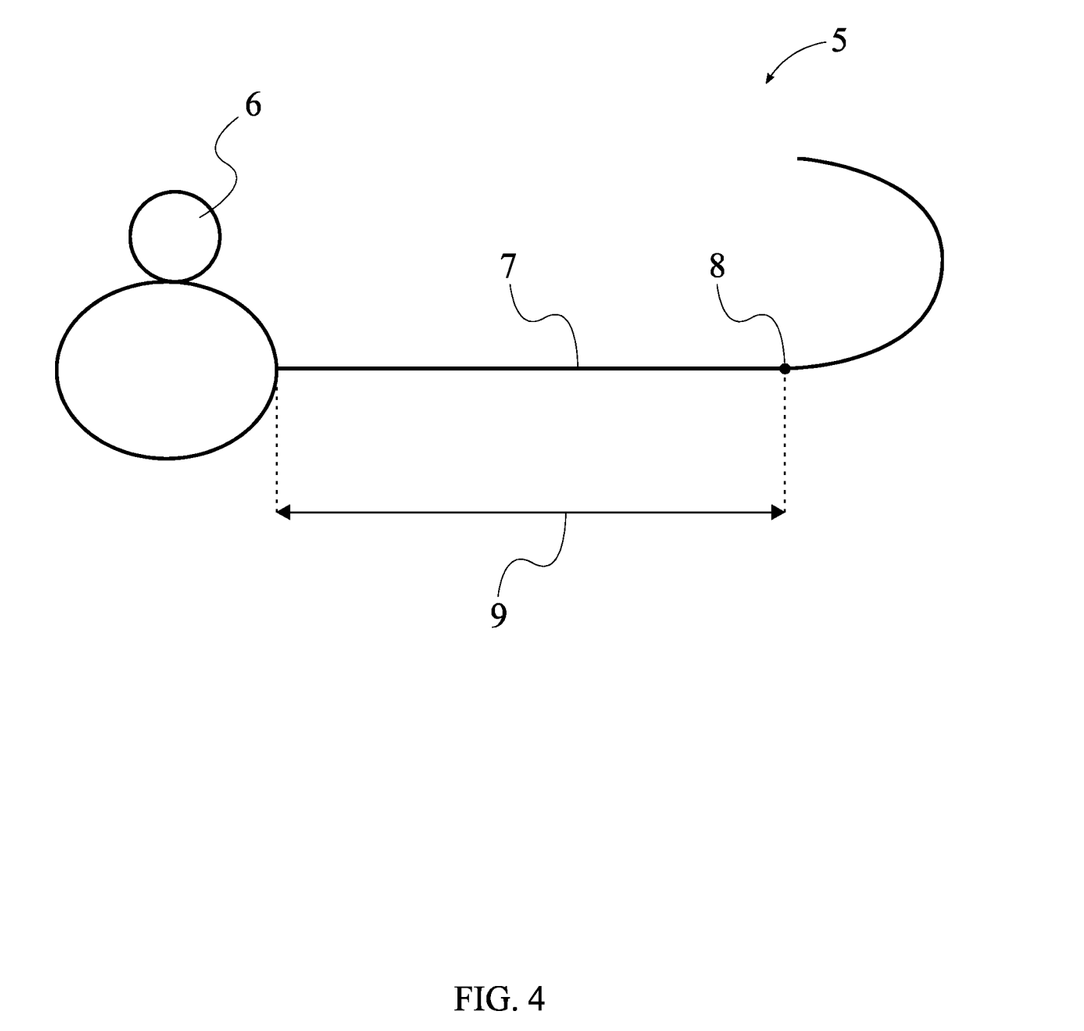
FIG. 4 is a schematic view of step C illustrating the reference points of a fishing hook.
Figure 10:
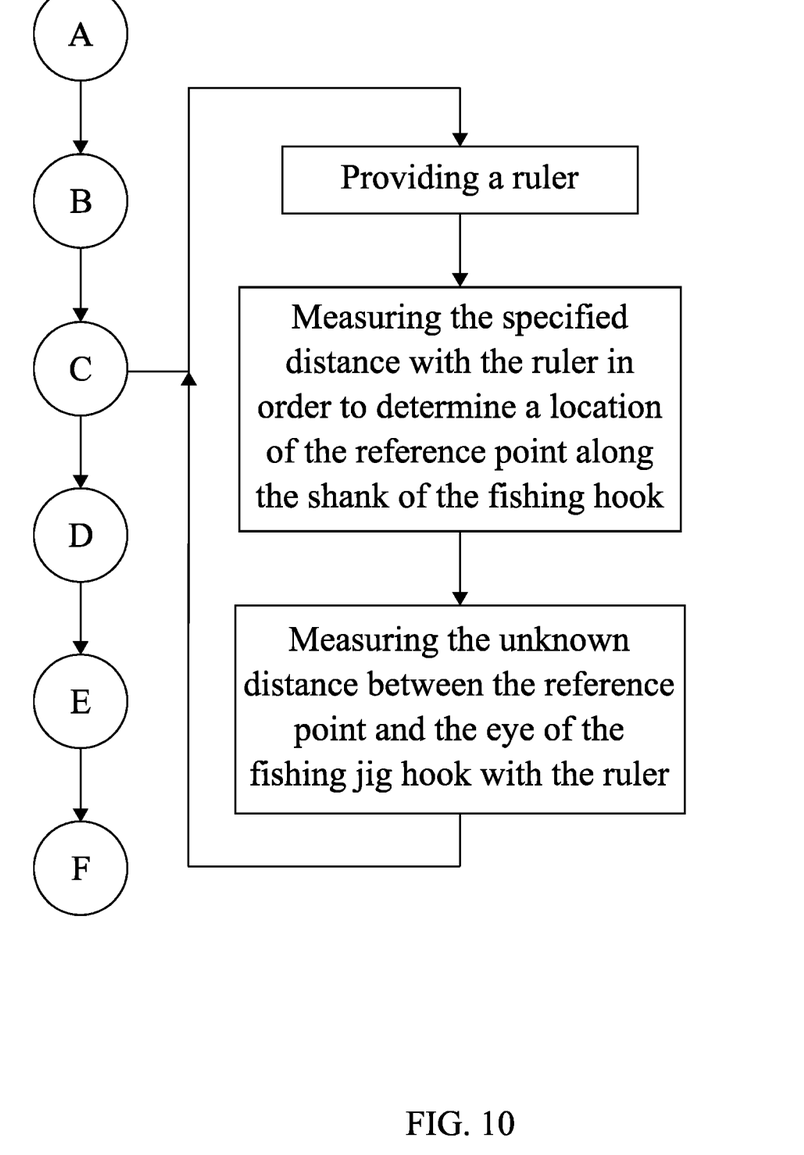
FIG. 10 is a flowchart illustrating the subprocess of making relevant measurements.

Upon completion of Step B, Step C begins by providing a ruler, as seen in FIG. 10. The ruler is a length of wood or other material with unit markings or indications that enable measurements of standardized units of length. The user measures the specified distance 9 with the ruler in order to determine a location of the reference point 8 along the shank 7 of the fishing hook, as seen in FIG. 4. Determination of the reference point 8 allows the user to prepare the fishing hook for addition into a fishing jig. The user then measures the unknown distance between the reference point 8 and the eye 6 of the fishing jig hook 5 with the ruler. In this way, the unknown distance becomes known to the user, who can perform subsequent processes using the unknown distance as a reference. In an embodiment, the specified distance 9 is 12 millimeters. This arrangement is common for standard hook sizes.

Figure 11:
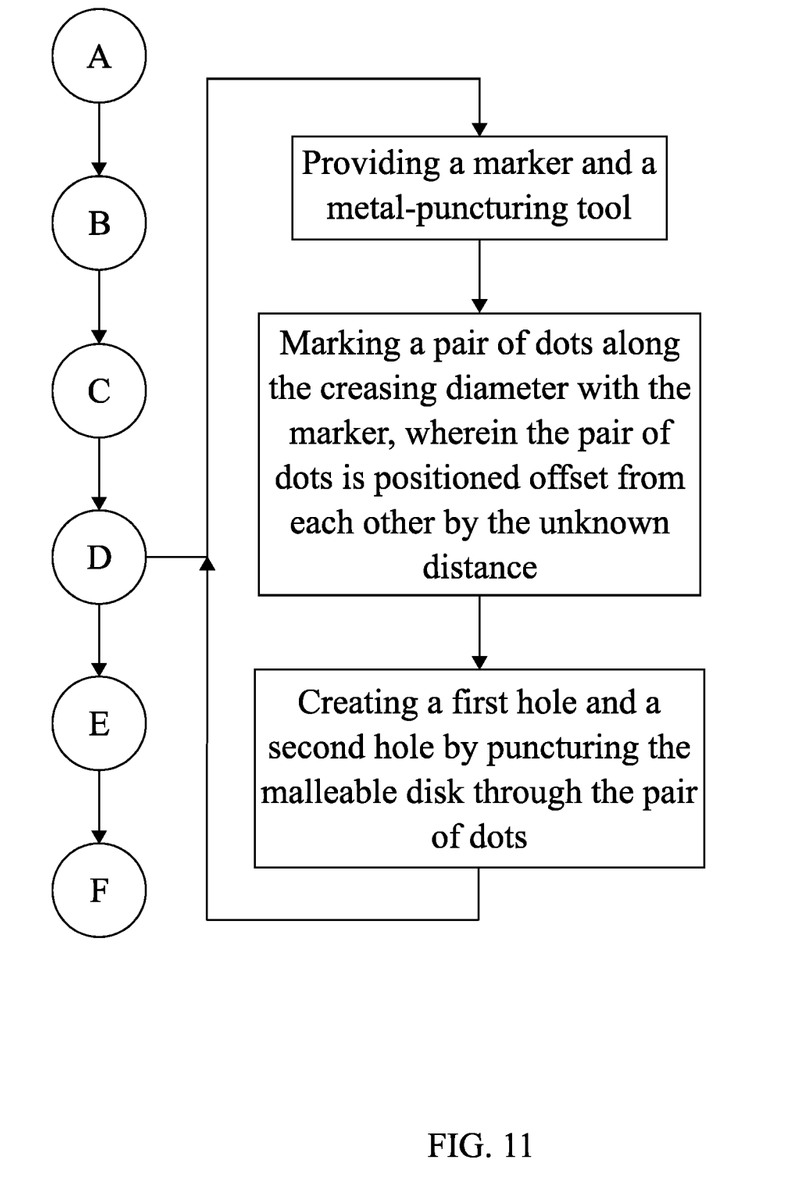
FIG. 11 is a flowchart illustrating the subprocess of creating holes for a fishing jig hook.

Upon determination of the unknown distance in Step C, the user is prepared to further manipulate the malleable disk 1. To this end, Step D begins by providing a marker and a metal-puncturing tool, as seen in FIG. 11. The marker is a writing implement that leaves permanent ink marks upon a surface. The metal-puncturing tool is a rigid pointed cylindrical extrusion which allows for creation of preferably circular holes traversing through the malleable disk 1. A pair of dots are marked along the creasing diameter 2 with the pen, wherein the pair of dots is positioned offset from each other by the unknown distance. The unknown distance measured from the fishing hook results in the pair of dots being positioned an appropriate space apart for the fishing hook. The pair of dots is used as a reference point 8 for subsequent processing. A first hole 10 and a second hole 11 are created by puncturing the malleable disk 1 through the pair of dots with the metal-puncturing tool. This arrangement results in a pair of openings that are appropriately spaced for the addition of a fishing hook.

Figure 12:
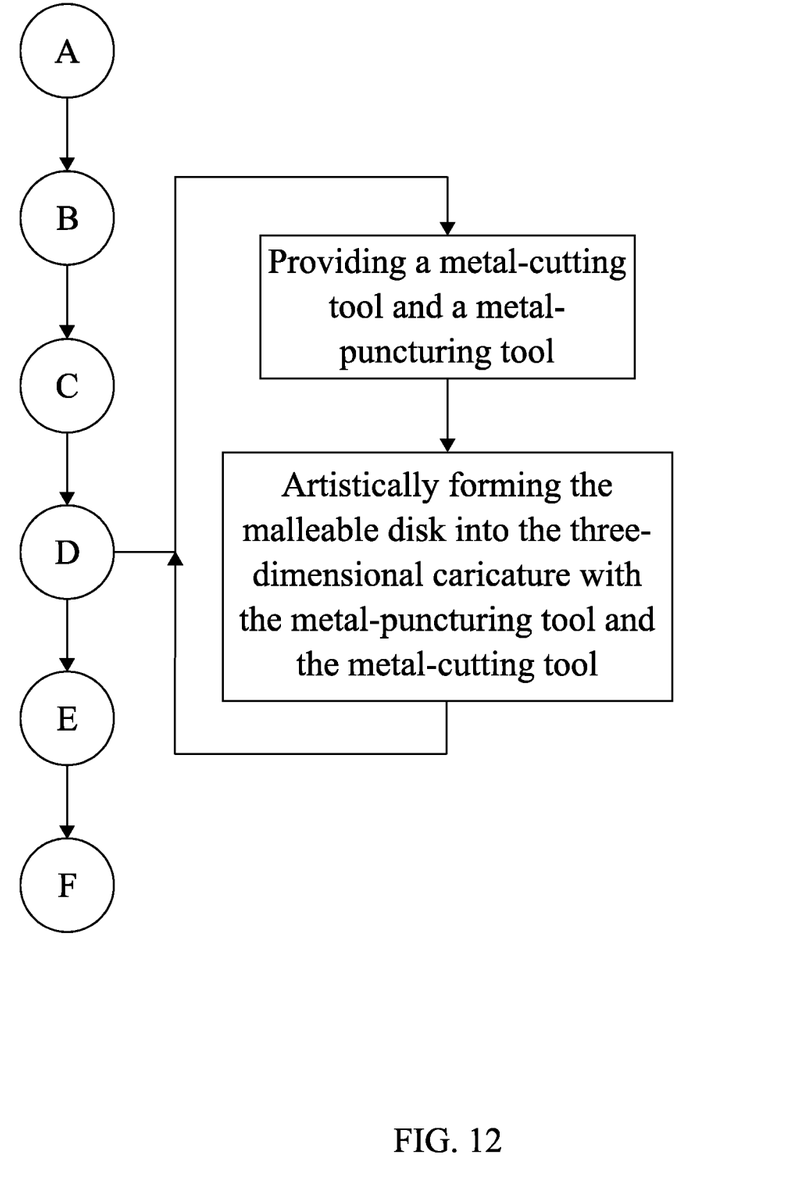
FIG. 12 is a flowchart illustrating the subprocess of forming a three-dimensional caricature.
Figure 13:
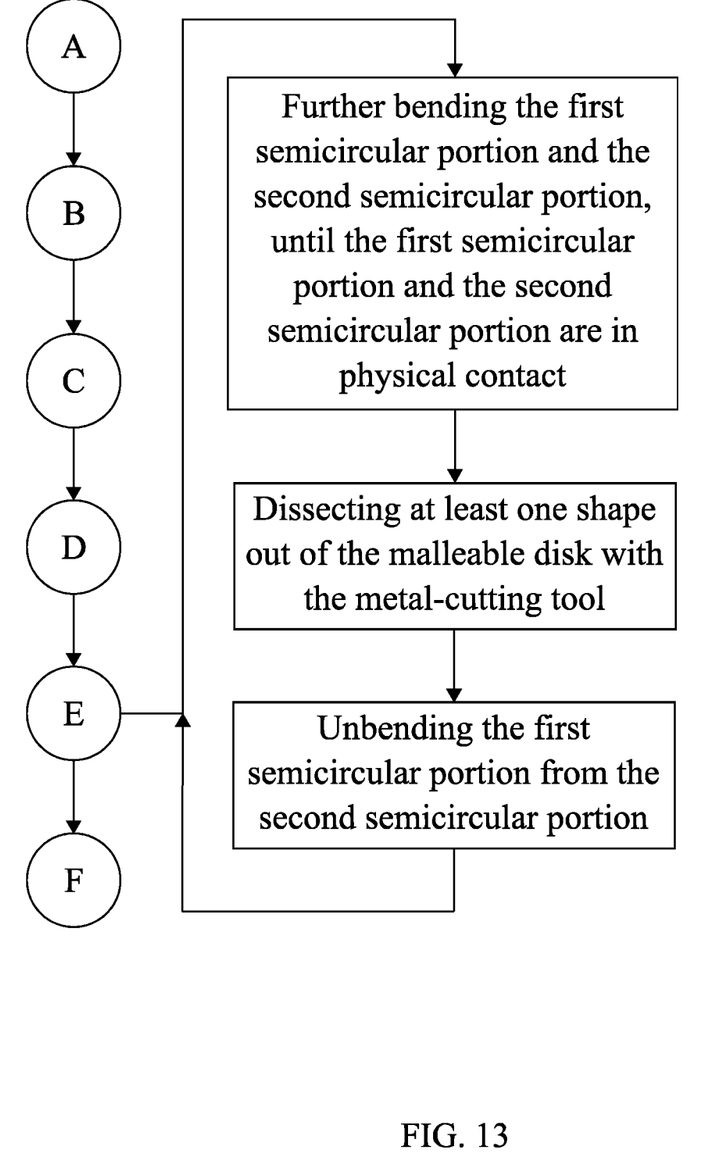
FIG. 13 is a flowchart illustrating the subprocess of further forming the three-dimensional caricature.

Following the hole creation of Step D, Step E begins by providing a metal-cutting tool and a metal-puncturing tool. The metal-cutting tool and the metal-puncturing tool are used in conjunction to allow the user to shape the preformed malleable disk 1. The malleable disk 1 is artistically formed into the three-dimensional caricature with the metal-puncturing tool and the metal-cutting tool, as seen in FIG. 12. In this way, the malleable disk 1 is converted into a shape that is more visually attractive to fish than the malleable disk 1 alone. In an exemplary embodiment, the first semicircular portion 3 and the second semicircular portion 4 are further bent, until the first semicircular portion 3 and the second semicircular portion 4 are in physical contact. The steps for performing this task are outlined in FIG. 13. This arrangement improves the ability of the user to subsequently turn the malleable disk 1 into a symmetrical shape. At least one shape is dissected out of the malleable disk 1 with the metal-cutting tool. This results in a symmetrical caricature that moves more efficiently through the water during use. Finally, the first semicircular portion 3 is unbent from the second semicircular portion 4. This results in a fully-formed three-dimensional caricature that is prepared for the hook addition of Step F.

Figure 14:
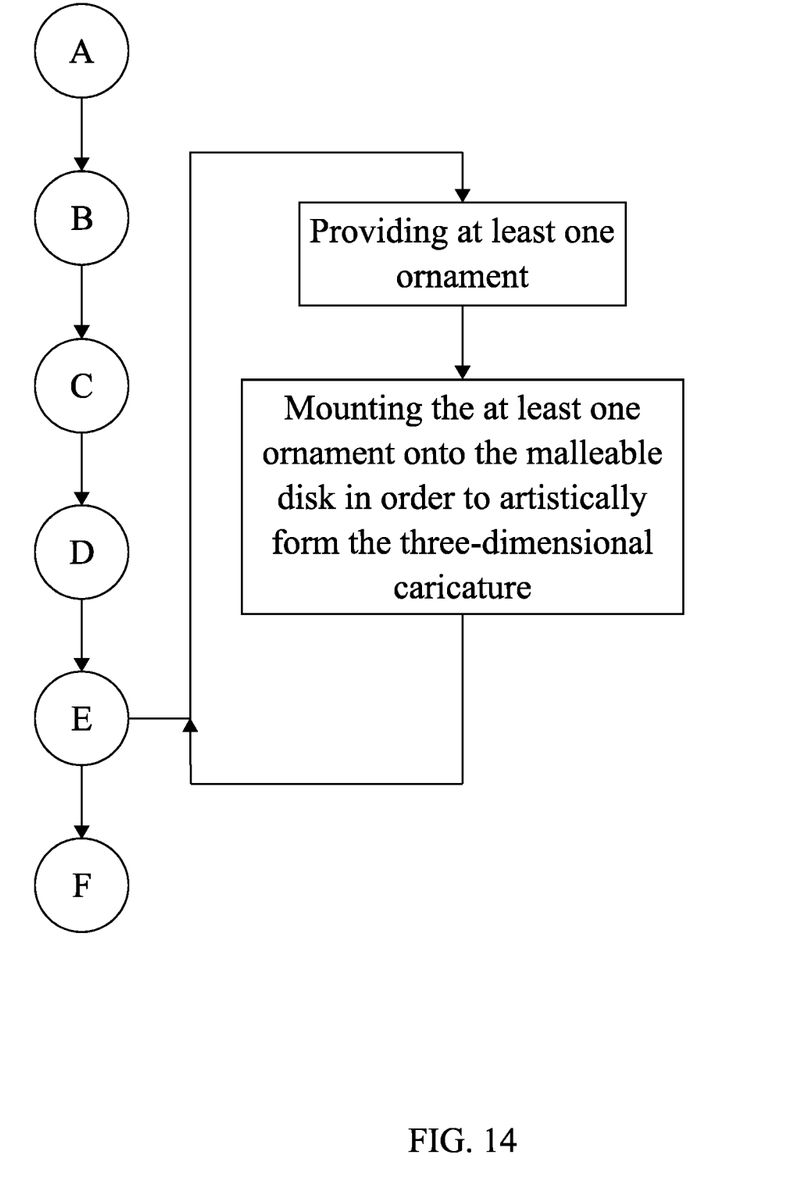
FIG. 14 is a flowchart illustrating the subprocess of adding ornaments to the three-dimensional caricature.

The user may find that a three-dimensional caricature cut from the malleable disk 1 is insufficiently similar to the target bait shape. To this end, the present invention further provides at least one ornament 13, as seen in FIGS. 6 and 14. The at least one ornament 13 is a three-dimensional unit that attaches to the three-dimensional caricature in order to enhance the visual appeal of the formed jig lure. The at least one ornament 13 may be any of baubles, beads, markings, feathers, or other such decorations that enhance the similarity of the three-dimensional caricature to the target bait shape. The at least one ornament 13 is mounted onto the malleable disk 1 in order to artistically form the three-dimensional caricature. Pending appropriate fishing skill, the resulting three-dimensional caricature is accurate enough to attract target fish.

In a further embodiment, a thickness of the malleable disk 1 is between 0.02 and 1.04 millimeters. This ensures that the malleable disk 1 is bent sharply enough to cut through water, but also dully enough to avoid damage due to sharp edges.

Although the invention has been explained in relation to its preferred embodiment, it is to be understood that many other possible modifications and variations can be made without departing from the spirit and scope of the invention as hereinafter claimed.

What is claimed is:

1. A method for manufacturing a fishing jig, the method comprises the steps of:
    (A) providing a malleable disk and a fishing jig hook;
    (B) folding the malleable disk about a creasing diameter of the malleable disk into a first semicircular portion and a second semicircular portion;
    (C) measuring an unknown distance from an eye of the fishing jig hook to a reference point along a shank of the fishing jig hook, wherein the reference point is offset from a bend of the fishing jig hook by a specified distance;
    (D) forming a first hole and a second hole along the creasing diameter, wherein the first hole and the second hole are positioned offset from each other by the unknown distance;
    providing a marker and a metal-puncturing tool;
    marking a pair of dots along the creasing diameter with the marker, wherein the pair of dots is positioned offset from each other by the unknown distance;
    creating a first hole and a second hole by puncturing the malleable disk through the pair of dots with the metal-puncturing tool;
    (E) configuring the malleable disk into a three-dimensional caricature; and
    (F) mounting the shank of the fishing jig hook through the first hole and the second hole.

2. The method for manufacturing a fishing jig, the method as claimed in claim 1 comprises the steps of:
    providing a metal-cutting tool and an unshaped piece of sheet metal; and
    cutting the unshaped piece of sheet metal into the malleable disk with the metal-cutting tool.

3. The method for manufacturing a fishing jig, the method as claimed in claim 1 comprises the steps of:
    providing a folding rod;
    placing the folding rod along the creasing diameter against a bottom circular face of the malleable disk; and
    simultaneously applying a first downward force on the first semicircular portion against a top circular face of the malleable disk and a second downward force on the second semicircular portion against the top circular face, while applying an upward force on the folding rod.

4. The method for manufacturing a fishing jig, the method as claimed in claim 1 comprises the steps of:
    forming an arch-shaped bend through the malleable disk along the creasing diameter during Step (B).

5. The method for manufacturing a fishing jig, the method as claimed in claim 4, wherein a curvature radius of the arch-shaped bend is greater than or equal to 3 millimeters.

6. The method for manufacturing a fishing jig, the method as claimed in claim 1 comprises the steps of:
    providing a ruler;
    measuring the specified distance with the ruler in order to determine a location of the reference point along the shank of the fishing hook; and
    measuring the unknown distance between the reference point and the eye of the fishing jig hook with the ruler.

7. The method for manufacturing a fishing jig, the method as claimed in claim 6, wherein the specified distance is 12 millimeters.

8. The method for manufacturing a fishing jig, the method as claimed in claim 1 comprises the steps of:
    providing a metal-cutting tool and a metal-puncturing tool; and
    artistically forming the malleable disk into the three-dimensional caricature with the metal-puncturing tool and the metal-cutting tool.

9. The method for manufacturing a fishing jig, the method as claimed in claim 8 comprises the steps of:
    further bending the first semicircular portion and the second semicircular portion, until the first semicircular portion and the second semicircular portion are in physical contact;
    dissecting at least one shape out of the malleable disk with the metal-cutting tool; and
    unbending the first semicircular portion from the second semicircular portion.

10. The method for manufacturing a fishing jig, the method as claimed in claim 1 comprises the steps of:
    providing at least one ornament; and
    mounting the at least one ornament onto the malleable disk in order to artistically form the three-dimensional caricature.

11. The method for manufacturing a fishing jig, the method as claimed in claim 1, wherein a thickness of the malleable disk is between 0.02 and 1.04 millimeters.

* * * * *